United States Patent [19]

Mizuhara

[11] 4,420,459
[45] Dec. 13, 1983

[54] METHOD OF MAKING PREFORMS FOR BRAZING AND HARDFACING

[75] Inventor: Howard Mizuhara, Hillsborough, Calif.

[73] Assignee: GTE Products Corporation, Stamford, Conn.

[21] Appl. No.: 339,358

[22] Filed: Jan. 15, 1982

Related U.S. Application Data

[63] Continuation-in-part of Ser. No. 198,684, Oct. 20, 1980, abandoned.

[51] Int. Cl.³ .............................................. B22F 1/00
[52] U.S. Cl. ..................................... 419/61; 264/115; 264/141; 264/219; 264/220; 264/221
[58] Field of Search ............... 264/115, 141, 219, 220, 264/221

[56] References Cited

U.S. PATENT DOCUMENTS 3,627,865 12/1971 Wittwer ............................. 264/141
3,739,051 6/1973 Smith ................................. 264/219
4,113,480 9/1978 Rivers ................................. 264/111
4,250,127 2/1981 Warren et al. ........................ 264/22

*Primary Examiner*—James R. Hall
*Attorney, Agent, or Firm*—Donald R. Castle; John F. Lawler

[57] ABSTRACT

A method of making preforms from brittle metals for brazing or hardfacing consists of pulverizing the metals into a powder, mixing the powder with a liquid vehicle to form a paste, passing the paste through a coated screen having an opening in the coating with the size and shape of the desired preform, depositing the output of the screen onto a substrate and thereby making the preform, heating the preform to evaporate the liquid vehicle, and removing the preform from the substrate. The opening in the screen coating is made by exposing a photo-sensitive film to light through a photographic negative or similar mask having the image of the preform and chemically removing a portion of the film to form an opening having the shape of the preform, the film being mounted on the screen either before or after such exposure.

9 Claims, No Drawings

METHOD OF MAKING PREFORMS FOR BRAZING AND HARDFACING

BACKGROUND OF THE INVENTION

This is a continuation-in-part of Ser. No. 198,684 filed Oct. 20, 1980 now abandoned.

This invention relates to an improved method for making brazing alloy or hardfacing preforms.

The manufacture of brazing alloy performs or inserts typically is accomplished by preparing the alloy in the form of a foil of the desired thickness and stamping inserts having the desired shape from the foil with suitable dies. The more complex the shape of the preform, the more complex is the die. The disadvantages of this method are that the foil rolling process is time consuming and expensive, the dies themselves are costly and have a limited life, and the stamping process produces a high percentage of scrap.

U.S. Pat. No. 3,786,854 describes a method of casting brittle brazing alloys in substantially pure strip form which avoids the rolling process. However, stamping machinery is required for preforms having other than the simplest shapes with the attendant cost and waste disadvantages.

This invention is directed to a process of making such preforms which avoids the above described problems.

OBJECTS AND SUMMARY OF THE INVENTION

A general object of the invention is the provision of a method of making brazing alloy preforms without resort to complex steel tooling for stamping.

A further object is the provision of a cost saving method for making preforms having complex shapes.

Still another object is the provision of a method of casting brazing alloy and hardfacing preforms with excellent control of the preform thickness.

These and other objects of the invention are achieved by photographically forming on a coated screen an opening having the shape of the desired preform, placing the screen over a substrate, mixing the brittle metal as a powder with a liquid vehicle to make a paste, and squeezing the paste through the opening in the coated screen onto said substrate to make the green preform. Optionally the green preform may be removed from the substrate or premelted on the substrate or kept in the green state until utilized.

DESCRIPTION OF PREFERRED EMBODIMENTS

In accordance with this invention, a screen made of stainless steel or the like is coated with a light sensitive polymer film so that the spaces between the strands of the screen are filled or covered. The screen is then masked by a photographic negative having the image of the desired preform and is exposed to light through the negative. The exposed film is thereafter treated chemically to etch in the film an opening having the precise shape and size of the preform. Alternatively, the screen may be prepared by transferring to the screen a stencil-like sheet comprising a photo-sensitive emulsion or film in which the preform-shaped opening has been formed by the process prior to the transfer.

The brittle metal constituting the brazing alloy or hardfacing material to be made into the desired preform is pulverized, i.e., ground or atomized into a powder which is then mixed with an organic or other vehicle to form a paste. The powder shape, particle distribution and percent metal distribution in the vehicle defines the viscosity of the paste which is sufficient to prevent flow by gravity through the preform-shaped opening in the coated screen. The paste is then applied to the screen and the latter is positioned directly over a substrate, such as a foil of steel or polyester film such as Mylar. A blade or "squeegee" is drawn over the paste-filled screen to force the paste through the opening in the screen coating and onto the substrate below. The fineness of the screen mesh, the viscosity of the paste and the pressure applied by the blade determine the thickness of the paste deposited on the substrate. This deposited paste on drying constitutes the green preform which may be premelted on the substrate if the latter has a melting temperature higher than that of the preform, or retained in the green state until assembled and brazed.

The invention has particular advantage and utility with hard and brittle metals and alloys which cannot be rolled into foil. Examples of such brazing alloys are nickel base alloys AMS 4775 (3.1 boron, 14.0 chromium, 4.5 silicon, 4.5 iron, 0.6–0.9 carbon, balance nickel), AMS 4776 (3.1 boron, 4.5 silicon, 4.5 iron, 14.0 chromium, balance nickel), AMS 4777 (3.0 boron, 4.0 silicon, 3.0 iron, 7.0 chromium, balance nickel), AMS 4778 (2.9 boron, 4.5 silicon, balance nickel) and AMS 4779 (1.8 boron, 3.5 silicon, balance nickel), all proportions being given in percent by weight. In addition, a mixture of one or more of such AMS alloys or other metals and such hard materials as powdered tungsten, molybdenum, tungsten carbide, tantalum carbide, chromium carbide, diamond and titanium carbide may be made into preforms useful for hardfacing applications such as saw blade tips, power shovel blade tips, valve seats and the like.

The invention also contemplates the continuous automatic production of brazing alloy and hardfacing preforms by successively depositing a paste as preforms on a moving polyester-coated belt, drying the preforms by infrared heater or the like and peeling the dried preforms from the belt.

The invention is illustrated by the examples which follow:

EXAMPLE I

The masked screen used in this and subsequent examples consisted of a stainless steel 60 mesh screen (U.S. Standard Sieve Scale) attached as the bottom wall of a box-like frame having 250 micron apertures and coated over the entire screen surface with the light sensitive polymer direct emulsion sold under trademark SAATI-POL by Dorn Co., Sunnyvale, Calif. A photographic negative having an image with an annular or ring-like shape was placed over the coated screen and light was directed through the negative on the screen. The exposed coating was then chemically etched with 1% to 2% sodium hydroxide solution which formed in the coating an opening having the precise shape and dimensions of the image.

AMS 4779 in the form of −200 mesh atomized powder was mixed with a liquid vehicle consisting of 6% ethyl cellulose and 94% terpineol in the following proportion to derive a paste composition:

10% vehicle
90% AMS 4779 powder

The substrate was a continuous length of 1010 steel foil 3" wide by 1.5 mils thick.

The steel substrate was placed below the screen. The paste was applied to the screen and the blade moved once across the screen, forcing the paste through the coating opening onto the steel substrate and forming thereon a green preform. The screen was removed and the substrate with the preform was heated to 1130° C. in a furnace having a cracked ammonia atmosphere. The heating continued until the preform began to melt but did not flow.

The melted preform and the substrate were next immersed in a solution of 25% water—60% hydrochloric acid—15% ferric chloride at 70° C. to dissolve the substrate. The solution was agitated for approximately 20 minutes and completeness of dissolution of the steel foil was determined visually. The resulting preform was found to be 2 mils thick, slightly rough on the top side, smooth on the bottom or substrate side, had a feathered edge and withstood slight bending without cracking.

EXAMPLE 2

The procedure described in Example 1 was repeated with the same brazing alloy but the substrate used was a 3"×3"×1/16" steel plate on which the green preform was deposited from the opening in the screen coating. A second steel plate was then placed over the substrate and in light contact with the preform. This assembly was heated in the vacuum furnace until the preform melted and was then cooled to room temperature. The brazed joint was mounted, polished and observed to be dense and uniform.

EXAMPLE 3

Two steel pieces were brazed together as described in Example 2 except that the preform was melted without flowing prior to assembly braze. The results were substantially the same.

EXAMPLE 4

The same alloy powder as described in Example 1 was mixed with the following organic binder in the proportions listed:

|  | % by Weight |
|---|---|
| Ethylene glycol | 2 |
| Polyvinyl alcohol - 10% solution | 10 |
| AMS 4779 | 88 |

The resulting paste was screened as described directly on a Mylar film and was thereafter dried with an infrared heater. The preform was then peeled off the film. One face of the preform may be moistened to attach it to a substrate or other piece to be brazed. The flexibility of this preform permits it to be wrapped around a curved surface.

The preform described above in Example 4 may be automatically mass produced by continuously moving a Mylar belt under the screen and successively extruding preforms from the coating opening on the screen onto the belt. The belt is then passed under an infrared heater to dry the preforms which thereafter are automatically peeled from the belt.

What is claimed is:

1. A method suitable for manufacturing flat brittle metal alloy brazing preforms comprising:
    (a) forming a powder of a predetermined particle size, said powder being said brittle metal alloy,
    (b) mixing said powder with a volatile organic vehicle to form a paste of a predetermined viscosity,
    (c) covering a screen having opening between the strands thereof with a light sensitive coating to fill the opening between said strands with said light sensitive coating,
    (d) masking said screen with a sheet having an image of a desired preform pattern,
    (e) exposing said coating with light through said sheet to sensitize said coating with said image,
    (f) etching the coating to remove said sensitized areas to define an opening in said coating, said opening having said preform pattern,
    (g) placing a substrate on one side of said screen,
    (h) forcing a predetermined amount of said paste through said opening from the opposing side of said screen to form a deposit upon said substrate, said deposit being a green preform relatively uniform in thickness, and
    (i) heating said green preform to remove said organic vehicle to form said flat, brittle metal alloy.

2. The method according to claim 1 with the additional steps of
    successively passing said predetermined amount of said paste through said coating opening in the screen to form a plurality of said preforms, and
    moving said substrate under said screen and receiving said preforms at spaced intervals along the substrate.

3. The method according to claim 1 with the additional steps of
    applying heat to the preform on the substrate, and separating the preform from the substrate.

4. The method according to claim 3 in which said heat is applied until the metal preform begins to melt but does not flow.

5. The method according to claim 1 in which said material comprises a photosensitive film, the additional steps of
    covering the screen with said film,
    applying to said film a mask having an image of said predetermined shape
    exposing said film to light through said mask and thereby optically transferring said image to said film, and
    chemically removing the imaged portion of said film whereby to form an opening in the film having said predetermined shape.

6. The method according to claim 1 in which said material comprises a photosensitive film, the additional steps of
    applying to said film a mask having an image of said predetermined shape,
    exposing said film to light through said mask and thereby optically transferring said image to said film,
    chemically removing the imaged portion of said film whereby to form an opening in the film having said predetermined shape, and
    placing said film on the screen.

7. The method according to claim 1 in which said brittle metal comprises a brazing alloy selected from the group consisting of AMS 4774-4779, inclusive.

8. The method according to claim 1 in which said substrate is a continuous belt and is moved under said screen, successively passing predetermined amounts of said paste through the portion of the screen within said material opening to make a plurality of preforms, and depositing said preforms at spaced intervals on said moving substrate.

9. A method suitable for manufacturing flat brittle metal alloy brazing preforms comprising:
   (a) forming a powder of a predetermining particle size, said powder being said brittle metal alloy,
   (b) mixing said powder with a volatile organic vehicle to form a paste of a predetermined viscosity,
   (c) positioning a screen over a substrate, said screen having an opening having a predetermined pattern corresponding to the desired configuration of said preform, and
   (d) forcing a predetermined amount of said paste through said opening from the opposing side of said screen to form a deposit upon said substrate, said deposit being a green preform relatively uniform in thickness.

* * * * *